United States Patent

[11] 3,537,628

[72] Inventor Robert G. Thompson
5312 S. Melvina Ave., Chicago, Illinois 60638
[21] Appl. No. 699,695
[22] Filed Jan. 22, 1968
[45] Patented Nov. 3, 1970

[54] ARTICULATED CARRYING MEANS
1 Claim, 4 Drawing Figs.
[52] U.S. Cl. .................................................. 224/5, 190/52
[51] Int. Cl. .......................................................... A01k 97/06
[50] Field of Search ........................................ 224/13, 17, 22, 23, 26, 5, 5.2, 5.8, 5.21; 43/57.5; 150/28; 190/43, 52

[56] References Cited
UNITED STATES PATENTS
| | | | |
|---|---|---|---|
| 2,672,903 | 3/1964 | Machinist ................ | 150/28 |
| 3,221,959 | 12/1965 | Southwick ................ | 190/43X |
| 797,667 | 8/1905 | Davis ....................... | 224/23UX |
| 2,679,960 | 6/1954 | Lowe ........................ | 224/5(.8)UX |
| 2,691,400 | 10/1954 | Giordano ................. | 224/5(.8)X |
| 2,717,391 | 9/1955 | Bracken ................... | 43/57.5UX |

FOREIGN PATENTS
| | | | |
|---|---|---|---|
| 188,999 | 4/1937 | Switzerland ............. | 224/5 |
| 1,019,554 | 2/1966 | Great Britain ............ | 224/22 |

Primary Examiner—Gerald M. Forlenza
Attorney—Hofgren, Wegner, Allen, Stellman and McCord ABSTRACT: The present invention provides a plurality of pouches for carrying fishing tackle or the like, with the pouches being secured together in a manner permitting them to adapt themselves to the contour of the wearer's body so as to provide a readily accessible and yet comfortable, and noninterfering container means for fishing tackle.

Patented Nov. 3, 1970
3,537,628
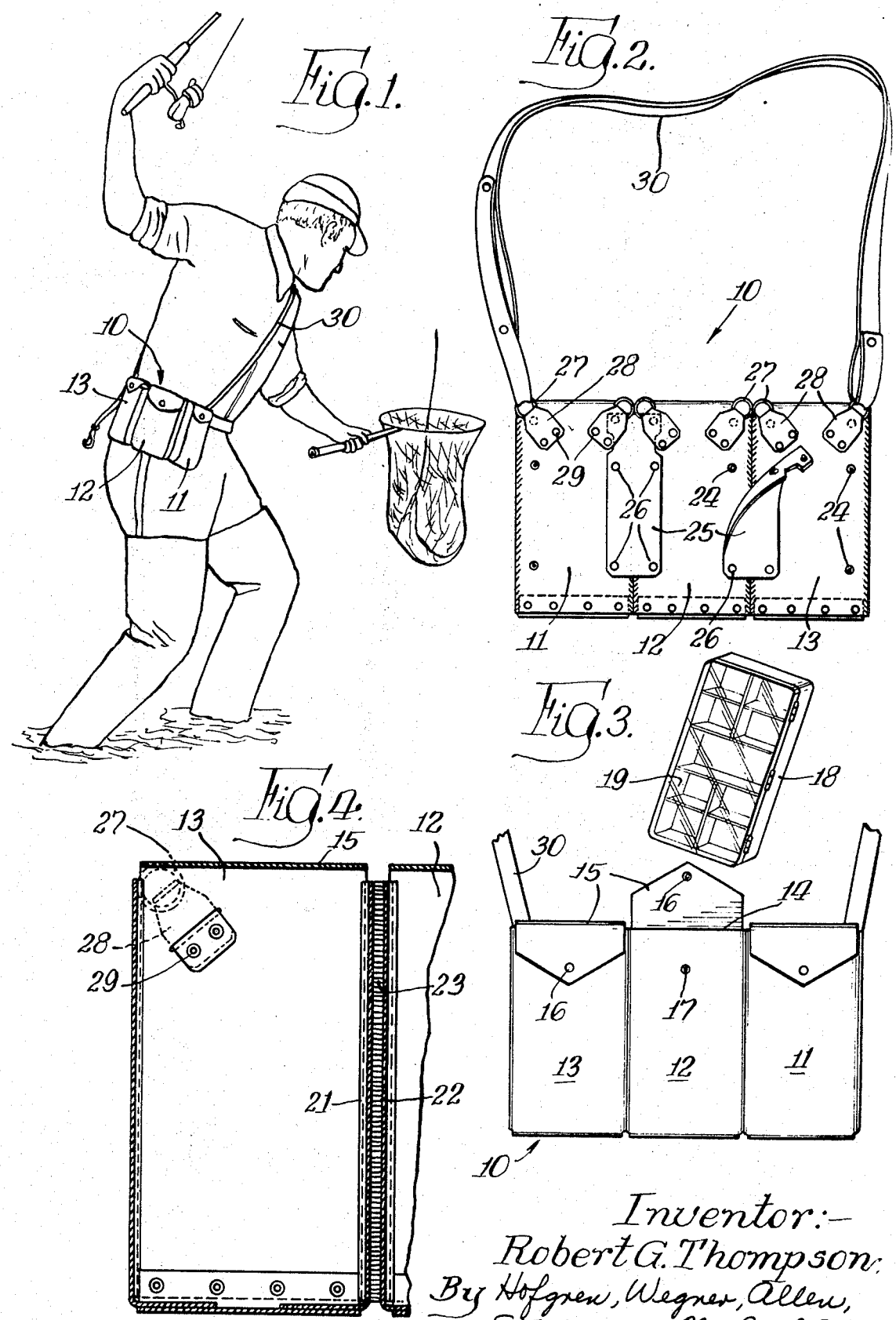

ARTICULATED CARRYING MEANS

This invention relates to a carrying means and more particularly to a carrying means in the form of a series of pouches particularly adapted to contain fishing tackle.

It is a general object of the present invention to produce a new and improved carrying means of the character described.

It is a more specific object of the invention to produce a carrying means in the form of an assembly of a number of pouches, said carrying means permitting the assembly to adapt itself to the contours of the wearer's body so as not only to be comfortable when worn, but also to be noninterfering with movements of the wearer.

While it will be readily apparent to those skilled in the art that the carrying means of the present invention has a multiplicity of uses, it is particularly useful to a fisherman for the purpose of carrying various sorts of fishing tackle in a secure but yet convenient and readily available fashion. Thus, the invention contemplates a carrying means made up of a series of pouches of flexible material, each adapted to contain a more or less rigid container, preferably compartmented to hold various pieces of fishing gear. The pouches are hingedly connected together along their side edges so as to permit them to adapt to the contour of the wearer's body. Means are provided for slinging the pouches over the shoulder of the wearer and, if desired, the arrangement can be such so that pouches can be added or subtracted from the assembly of pouches as the needs of the fisherman require.

Other and further advantages of the invention will become readily apparent from the following detailed description and drawings, in which:

FIG. 1 is an elevational view of a fisherman wearing one of the carrying devices of the present invention;

FIG. 2 is an enlarged rear view of a three-pouch assembly of the carrying device of the present invention;

FIG. 3 is a front view of the device shown in FIG. 2 and also illustrating a suitable compartmented container; and FIG. 4 is an enlarged fractional rear view of two of the pouches showing a somewhat modified form of construction.

While this invention is susceptible of embodiment in many different forms, there is shown in the drawings and will herein be described in detail two embodiments of the invention with the understanding that the present disclosure is to be considered as an exemplification of the principles of the invention and is not intended to limit the invention to the embodiments illustrated. The scope of the invention will be pointed out in the appended claims.

The present invention includes an articulated carrying device 10 comprising in the embodiment illustrated three pouches 11, 12 and 13. The pouches are made of flexible material such as a flexible plastic, and each is provided with an open top 14 closeable by a flap 15. The flap may be held in closed position by a snap 16 and button 17 provided with each pouch.

Insertable into each pouch is a compartmented case 18 provided with a plurality of compartments such as 19 in order to hold sundry articles of fishing tackle. The individual pouches are hingedly secured to adjacent pouches along their longitudinal edges 21 and 22 either by stitching 23 as shown in FIG. 4, or by removable attaching means which may be utilized to add or subtract from the number of pouches making up a complete carrying assembly. In the latter form the pouches (as seen in FIG. 2) may be provided with buttons 24 to which a flexible strip 25 may be secured by means of snaps 26. As clearly shown in FIG. 2 the snaps 26 carried by the strips 25 are securable to buttons 24 provided on adjacent pouches.

The pouches are provided with eyelets 27 secured by means of snaps 28 and rivets 29 to the upper corners of each of the removable pouches of FIG. 2 or to the outer corners of the pouches illustrated in FIG. 4 which are permanently connected together. A sling 30 is connectible to the outermost of the eyelets and may be slung over the shoulder of the wearer to suspend the carrying device therefrom in the manner illustrated in FIG. 1.

Because of the flexible nature of the connection between adjacent pouches, whether it be by means of the stitching 23 or with the strips 25, the assembly of pouches is free to curve about the body of the wearer as can be seen in FIG. 1. When additional tackle is desired, the flap 15 may be opened permitting easy removal of the case 18 and the case, of course, may then be reinserted in its associated pouch and the snap refastened in closed position so as to provide a secure storage means for the tackle.

The number of pouches making up each assembly may be predetermined as in the embodiment of FIG. 4, or may be left to the discretion and needs of the individual angler, who can add or subtract pouches depending upon the nature of the fishing he intends to do and the character of the water to be fished.

While the device of the present invention is particularly suited for the carrying of fishermen's gear, obviously it can be adapted for use to carry other sorts of materials such as tools, fastenings, and the like.

I claim:

1. An articulated carrying means for fishing tackle comprising a generally rectangular pouch of flexible material, said pouch having an open top, a flap closing the top, a case of rigid material within the pouch and compartmented to receive and store tackle, at least one similar additional pouch, means for removably hingedly connecting one side edge of the first mentioned pouch to the corresponding side edge of the additional pouch, said connecting means including a single strip of said flexible material, the strip having a length approximating the length of said side edges and means for attaching said strip to each of said pouches with the strip bridging the gap therebetween, and means for suspending said pouches including an eyelet at the upper corner of each pouch and a sling adapted to be secured to the eyelets.